UNITED STATES PATENT OFFICE.

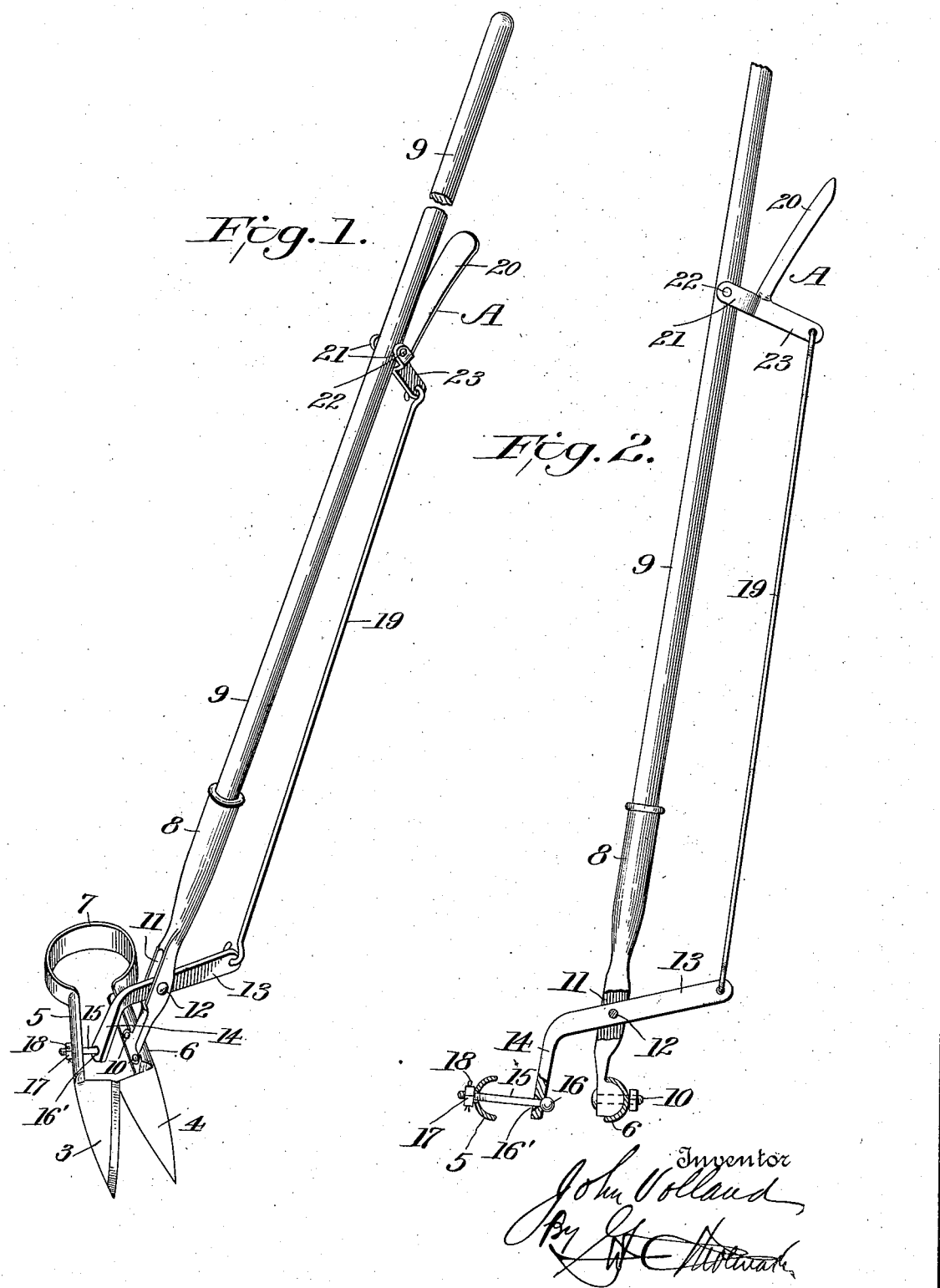

JOHN VOLLAND, OF FORT WAYNE, INDIANA.

LAWN-TRIMMING IMPLEMENT.

1,178,889.  Specification of Letters Patent.  Patented Apr. 11, 1916.

Application filed October 26, 1915. Serial No. 57,992.

*To all whom it may concern:*

Be it known that I, JOHN VOLLAND, a citizen of the United States, residing at Fort Wayne, in the county of Allen and State of Indiana, have invented certain new and useful Improvements in Lawn-Trimming Implements, of which the following is a specification.

This invention relates to lawn trimming implements or the like.

One object is to provide an implement of the nature stated particularly adapted to cut the grass close around bushes, shrubbery, trees, etc., and along sidewalks or near fences, walls and other places where a lawn mower cannot be used for the purpose of cutting or trimming the grass.

Another object resides in the provision of an implement of the nature stated, embodying among other characteristics, a cutting device which is adapted to be easily steered over a lawn in substantially parallel relation to the ground and to which is connected and positioned with relation thereto means to operate the same without the necessity of the manipulator stooping during the cutting or trimming process.

Another object resides in the provision of a simple, economical, durable and efficient implement for cutting or trimming the grass on lawns, as well as for cutting different kinds of weeds out of the lawn and which may be operated by either or both arms of the user.

It is still further designed to provide an implement embodying a cutting device adapted to be steered over the ground substantially parallel thereto and by means disposed at an incline to the parallel plane of the ground manipulated to perform the cutting or trimming process, obviating the necessity of stooping on the part of the user of the implement.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:—Figure 1 is a perspective view of one embodiment of my invention. Fig. 2 is a side elevation partly in section.

Referring now more particularly to the accompanying drawings, the trimming or cutting device as distinguished from the handle or operating parts of the same, consists preferably of coöperating cutting blades, and, as shown in the accompanying drawings, this cutting or trimming device may consist of a pair of sheep shears consisting of two coöperating blades 3 and 4, each having arms 5 and 6, respectively, connected by a bight or spring loop 7. The arms 5 and 6 are preferably concavo-convex in cross-section and, generally speaking, the cutting device may be composed of an old and well known type of sheep shears embodying the various parts above referred to.

My invention herein disclosed consists in means for operating the sheep shears and is of such character as to enable the operation of the sheep shears by the manipulator without the necessity of the manipulator stooping during the cutting or trimming operation. To this end I provide a relatively long handle of any suitable character for connection with one of the arms of the sheep shears but, for purposes of illustration, I have shown a two-part handle, consisting of a metallic or other socket member 8 and a wooden or other part 9; the part 9 being fitted tightly in the socket of the part 8 and depending upon its tight fit against accidental disconnection of the parts, although, if desired, the parts may be secured together in any other suitable manner. The socketed member 8 is preferably enlarged transversely at its inner end and rounded on one side to conform to the shape of the concaved side of the arm 6 of the blade 4 and is fitted therein and secured against displacement with relation thereto through the instrumentality of suitable fastenings 10.

The sheep shears are adapted to be disposed in a plane parallel with the surface on which the grass or the like grows and in order that grass or the like growing under bushes may be readily trimmed or cut without the necessity of the manipulator of the implement stooping, the handle 8—9 is preferably disposed in an inclined plane with relation to the operative position of the sheep shears. This inclination of the handle 8—9 with relation to the operative plane of the sheep shears obviates the necessity of the manipulator stooping when operating the implement at any time, especially when operating adjacent the root of a plant and under the top of the plant.

The socketed member 8 is provided with a slot 11 intermediate its ends in which is pivoted, by means of a pivot 12, a lever 13. This lever 13 has a downwardly directed extension 14 which extends in between the arms 5 and 6 of the sheep shears and which, at its lower end, is provided with an aperture, to loosely receive a rod 15 having a ball 16 at one end operating loosely in a socket 16' at one end of the aperture of the extension 14. The opposite end of the rod 15 is passed loosely through an aperture formed in the arm 5 of the blade 3 and is screw threaded to take a nut 17 held thereon against accidental displacement through the instrumentality of a suitable key 18.

An operating lever A is secured to the outer end of the handle 8—9 and this operating lever has connection with the aforesaid lever 13 through the instrumentality of a long link 19 which, at its ends, has pivotal connection with the said levers. The operating lever A may consist of the handle operating part 20 provided with spaced ears 21 by which the same may be pivotally secured at 22 to the handle 8—9 and also provided with a lug 23 to which the aforesaid link 19 is connected.

By operating the handle operating part 20 of the operating lever A on its pivot 21, and by virtue of the link connection 19 between the operating lever A and the aforesaid lever 13, and the connection 16 between the extension 14 of the lever 13 and the arm 5, and the handle 8—9 being connected to the arm 6 of the blade 4, the blades 3 and 4 are shifted backwardly and forwardly in overlapping relation to effectually cut or trim the lawn. For instance, the blades 3 and 4 are normally separated incident to the yieldable bight connection 7 between the arms 5 and 6 of the respective blades 3 and 4. The blades 3 and 4 are closed on each other as the part 20 of the operating lever A is moved toward the part 9 of the handle, closing the blades with relation to each other against the yieldable action of the bight 7. Immediately upon permitting the part 20 of the operating lever A to move away from the handle 8—9, the yieldable bight portion 7 opens the blades. To insure an effectual cutting action the downward movement of the extension 14 of the lever 13 causes the blade 3 to gently but firmly bear upon the blade 4, thereby causing the blades to bear gently but firmly together, insuring an effectual shearing action.

By reason of the relatively long handle and the operating lever positioned thereon at the point shown, or thereabout, it is easy to steady the implement and convenient even for a one armed person to operate the same by placing the handle between the arm and the body and working the operating lever with one hand.

What is claimed is:

1. In a device of the character described, a pair of sheep shears whose blades are adapted to operate in a plane parallel to the surface on which the grass is being cut or trimmed, a handle rigidly secured to the sheep shears and disposed on an incline with relation to the cutting or trimming plane of the sheep shears, a lever pivotally connected to the handle and provided with an extension which projects between the arms of the blades, a short rod operating loosely through one of the arms of the blade and having connection with the extension of said lever, an operating lever connected to said handle, and a connection between said levers whereby the blades may be operated.

2. In a device of the character described, a pair of sheep shears including cutting blades and arms yieldably connected together, a handle of relatively long length rigidly secured to an arm of one of the blades of the sheep shears, a relatively short lever pivotally connected to the lower end of the handle, a connection between said lever and the arm of the sheep shears opposite the arm to which said handle is connected, an operating lever connected to the handle at a point substantially midway between the ends of the handle, and a connection between said levers whereby upon manipulation of the operating lever the sheep shears are operated for the purposes herein stated.

3. In a device of the character described, a pair of sheep shears including blades each having an arm and means for connecting the arms yieldably together to normally separate the blades, a handle secured to an arm of one of the blades, a lever pivotally connected to the handle and provided with an extension which projects between the arms of the blades, a short rod operating loosely through the arm of the blade opposite the arm to which the handle is secured, a ball and socket connection between said extension of said lever and said short rod, an operating lever connected to the handle and a connection between said levers whereby the blades may be brought together for cutting purposes against the action of the aforesaid connecting means between the arms of the sheep shears.

4. In a device of the character described, a pair of sheep shears including a pair of blades and arms which are substantially concavo-convex in cross section, and which are yieldably connected together to maintain the blades normally open, a handle secured to an arm of one of the blades, the handle having a slot therein, a lever pivotally mounted in said slot and having an extension projecting between the arms of the sheep shears, a short rod operating loosely through the arm opposite the arm to which the handle is connected and having ball and socket connection with the extension of said lever, an operating lever connected to the handle, and a connection between said levers whereby manipulation of the operating lever will close the blades against the action of said yieldable means which normally forces them open.

5. In a device of the character described, a cutting device adapted to operate in a plane substantially parallel to the ground to cut the grass, a relatively long handle rigidly secured to the cutting device and disposed on an incline with relation to the operative plane of the cutting device, a lever pivotally connected to the lower end of said handle and having operative connection with the cutting device, an operating lever pivotally connected to the handle at a point substantially midway between the ends thereof, and an operative connection between said levers whereby the device may be steadied from the outer end of the handle and the cutting device operated by one hand of the manipulator.

6. In a device of the character described, a pair of sheep shears including a pair of blades and arms which are substantially concavo-convex in cross section, and which are yieldably connected together to maintain the blades normally open, a handle secured to an arm of one of the blades, the handle having a slot therein, a lever pivotally mounted in said slot and having an extension projecting between the arms of the sheep shears, a short rod operating loosely through the arm opposite the arm to which the handle is connected and having ball and socket connection with the extension of said lever, an operating lever connected to the handle, and a connection between said levers whereby manipulation of the operating lever will close the blades against the action of said yieldable means which normally forces them open, the operating lever being located at a point along the handle to enable positioning of the latter between one's body and arm and permit operation of the operating lever.

In testimony whereof I affix my signature in the presence of two witnesses.

JOHN VOLLAND.

Witnesses:
ELEANORA ODDON,
H. R. KUHNE.